United States Patent Office 3,481,749
Patented Dec. 2, 1969

3,481,749
VITREOUS COMPOSITIONS OF MATTER
Yves Georges Godron, Paris, France, assignor to Compagnie de Saint-Gobain, Neuilly-sur-Seine, France
No Drawing. Continuation-in-part of application Ser. No. 531,029, Mar. 2, 1966, which is a continuation-in-part of application Ser. No. 189,659, Apr. 11, 1962, which in turn is a continuation-in-part of application Ser. No. 660,470, May 21, 1957. This application Apr. 7, 1967, Ser. No. 629,100
Claims priority, application France, May 25, 1956, 715,188, Patent 1,152,757; May 6, 1957, 737,903, Patent 71,509
Int. Cl. C03c 3/16; C10g 29/16
U.S. Cl. 106—47     6 Claims

ABSTRACT OF THE DISCLOSURE

A vitreous composition of matter having basic composition in mole percent:

|  | Percent |
|---|---|
| $Al_2O_3$ | 10–20 |
| $R_2O$ | 9–33 |
| RO | 16–20 |
| $P_2O_5$ | 29–61 | in which $R_2O$ is an alkali metal oxide and RO is a divalent metal oxide from the group BaO, CaO, MgO, PbO and ZnO.

---

This is a continuation-in-part of application Ser. No. 531,029, filed Mar. 2, 1966, now abandoned, which is a continuation-in-part of application Ser. No. 189,659, filed Apr. 11, 1962, now Patent No. 3,253,934, May 31, 1966, which in turn is a continuation-in-part of Ser. No. 660,470 filed May 21, 1957 and now abandoned.

This invention relates to vitreous compositions of matter, an important use of which is as lubricant glasses.

An important use of glass has been in the lubrication of metallic bodies at relatively high temperatures, for instance, in the extrusion of metals wherein a metal ingot is pushed or drawn through a die to increase its length and modify or reduce its transverse section. Many problems have beset this process, including the problem of securing lubrication of the ingot throughout its whole length. Another problem has been to provide a vitreous composition of good lubricating power, the viscosity of which can be changed in order to adapt it to particular uses without altering its qualitative composition and consequently its desirable properties. Yet another problem has been to prepare a vitreous lubricant, the raw materials of which can be readily vitrified but in which the vitreous product withstands relatively high temperatures and pressures very well.

The objects of the invention are, generally, to solve the problems which have been indicated hereinabove and to provide vitreous compositions, glasses, which may be generally used to lubricate metals during extrusions, particularly at relatively high temperatures, and which have at these temperatures convenient viscosity and an attackability by water and other common chemical agents which permits ready removal by washing after use.

The objects of the invention are accomplished, generally, by glass having the basic composition in mole percent:

|  | Percent |
|---|---|
| $Al_2O_3$ | 10–20 |
| $R_2O$ | 9–33 |
| RO | 16–20 |
| $P_2O_5$ | 29–61 | in which $R_2O$ is an alkali metal oxide, RO is a divalent metal oxide from the group BaO, CaO, MgO, PbO and ZnO of which CaO is not over 15 mole percent, of which PbO is not over 5 mole percent, of which ZnO, if present, is over 5% by weight of the glass, and in which $B_2O_3$ may replace $P_2O_5$ mole for mole up to 10% of the basic composition, in which a trivalent metal oxide $R_2O_3$ from the group $Fe_2O_3$ and $Cr_2O_3$, may replace $Al_2O_3$ up to 5% of the basic composition provided that $Al_2O_3$ is at least equal to 10%, and $R_2O+RO$ is less than 50% of the basic composition.

In these compositions the basic formulas are maintained in their integrity so that the mole content of each ingredient (alone or with its permissible amount and type of substituent) is always within the limits stated above. Thus, when BaO is taken to be 16 mole percent the resulting composition is:

|  | Percent by wt. |
|---|---|
| $P_2O_5$ | 40.25–66.95 |
| $Al_2O_3$ | 7.90–18.65 |
| $Na_2O$ | 4.25–18.70 |
| BaO | 18.70–22.40 | when $Na_2O$ is used as the alkali metal oxide, but when $K_2O$ is used as the alkali metal oxide the composition is

|  | Percent by wt. |
|---|---|
| $P_2O_5$ | 36.70–64.90 |
| $Al_2O_3$ | 7.65–17.00 |
| $K_2O$ | 6.30–25.85 |
| BaO | 18.30–20.45 |

When BaO is 20 molecular percent and $Na_2O$ is used the composition is

|  | Percent by wt. |
|---|---|
| $P_2O_5$ | 38.00–65.15 |
| $Al_2O_3$ | 7.65–18.20 |
| $Na_2O$ | 4.20–16.55 |
| BaO | 23.00–27.23 |

When $K_2O$ is used with 20% BaO the composition is

|  | Percent by wt. |
|---|---|
| $P_2O_5$ | 35–63.75 |
| $Al_2O_3$ | 7.50–16.75 |
| $K_2O$ | 6.25–23.15 |
| BaO | 22.50–25.10 |

As oxides of alkali metals, the ones principally used are sodium oxide, $Na_2O$, or potassium oxide, $K_2O$, or a mixture of sodium oxide, potassium oxide and lithium oxide, $Li_2O$, or a mixture of any two of these three oxides, the quantity of the different alkali metal oxides being varied to vary the alterability or the viscosity of the glass.

If it is desired to increase the resistance of the glass to atmospheric and chemical agents, one replaces a small quantity of phosphoric anhydride, for example, 5% to 10%, in molecular percentage in relation to the whole composition, by boric anhydride, $B_2O_3$. Thus, if one wishes the ingot to be readily cleaned by water alone or containing chemical agents which will aid and act on the glass, one reduces the content of $B_2O_3$.

Accordingly, one may equally replace a small amount of alumina, up to about 5%, in molecular percentage in relation to the whole composition, by oxides of a group of trivalent metal oxides exemplified by iron oxide, $Fe_2O_3$, and chromium oxide, $Cr_2O_3$. However, the percentage of $Al_2O_3$ is to be maintained at least equal to 10%.

Variations in the amounts of the oxides of the divalent metals from the group BaO, CaO, MgO, PbO, ZnO, make it possible to alter the properties of the composition for different uses without losing desirable properties by a change in the qualitative composition of the glass. For example, the attackability of the glass by water is reduced when the content of zinc oxide or magnesia is increased. Also, the viscosity is increased when in the mixture of divalent oxides, the zinc oxide is replaced by at least one oxide of the group comprising magnesium and calcium oxides, and when magnesia is substituted for at least one of the oxides of barium and calcium. The zinc oxide when present should be in excess of 5% of the weight of the glass. By this ability to change the viscosity, one adapts the composition to use at different temperatures and pressures. The ease of vitrification is improved by a reduction in the content of lime, in particular not above 15% in molecular percentage.

In order to obtain glasses having a relatively high viscosity suitable for their use as lubricants in the extrusion of metals at high temperatures, it is desirable to avoid the presence of PbO or at least to reduce its content to at most 5%. Due to this low content in PbO, the layer of glass on the extruded metal may be removed more easily.

The glasses according to the present invention are particularly useful in drawing metals at high temperatures from about 650° to 950° C.

The following examples illustrate the preparation of the compositions in accordance with the invention.

EXAMPLE 1

The following composition was melted at about 1250° C. in a refractory silico-aluminous crucible and was poured on a table to cool:

| | Parts by wt. |
|---|---|
| Trisodium phosphate | 35.7 |
| Diammonium phosphate | 69.0 |
| Borax | 14.1 |
| Hydrated alumina | 31.4 |
| Zinc oxide | 6.2 |
| Potassium carbonate | 13.45 |
| Magnesium carbonate | 10.75 |

The molecular composition of the glass thus made was as follows:

| | Molecular percentages |
|---|---|
| $P_2O_5$ (Phosphoric anhydride) | 27.4 |
| $B_2O_3$ (Boric anhydride) | 6.9 |
| $Al_2O_3$ (Alumina) | 18.9 |
| ZnO (Zinc oxide) | 7.2 |
| MgO (Magnesia) | 12.0 |
| $Na_2O$ (Sodium oxide) | 18.5 |
| $K_2O$ (Potassium oxide) | 9.1 |

Such a glass can be used as a lubricant for the extrusion of red copper at 800° C., the speed of the extrusion being 6 meters per second. The cleaning of the extruded metal may be obtained by chemical agents such as acidulated water.

EXAMPLE 2

The following mixture was melted at about 1240° C. in a crucible similar to that of Example 1 and was similarly poured on a table to cool:

| | Parts by wt. |
|---|---|
| Borax | 13.7 |
| Trisodium phosphate | 25.2 |
| Diammonium phosphate | 73.5 |
| Hydrated alumina | 19.9 |
| Zinc oxide | 10.0 |
| Barium carbonate | 10.3 |
| Potassium carbonate | 19.1 |

The resulting glass had the following molecular composition:

| | Molecular percentages |
|---|---|
| $P_2O_5$ | 32.3 |
| $B_2O_3$ | 7.9 |
| $Al_2O_3$ | 14.0 |
| ZnO | 13.7 |
| BaO | 5.7 |
| $Na_2O$ | 15.9 |
| $K_2O$ | 10.5 |

It will be observed that all claims and examples include a minimum of about 1% by weight of any divalent oxides and this may be taken to constitute the lower limit corresponding to a substantial amount.

EXAMPLE 3

This example describes a glass, made by methods similar to the foregoing. The product had a viscosity of 25 poises at 1000° C., indicating good fusibility. The composition:

| | In mole percent |
|---|---|
| $P_2O_5$ | 27.45 |
| $B_2O_3$ | 6.90 |
| $Al_2O_3$ | 18.75 |
| $Fe_2O_3$ | 0 |
| BaO | 0.70 |
| CaO | 6.80 |
| MgO | 4.75 |
| ZnO | 7.15 |
| $K_2O$ | 9.15 |
| $Na_2O$ | 18.35 |

| | In weight percent |
|---|---|
| $P_2O_5$ | 40.80 |
| $B_2O_3$ | 5.05 |
| $Al_2O_3$ | 20.00 |
| $Fe_2O_3$ | 0 |
| BaO | 1.1 |
| CaO | 4.00 |
| MgO | 2.00 |
| ZnO | 6.10 |
| $K_2O$ | 9.00 |
| $Na_2O$ | 11.95 |

EXAMPLE 4

This glass prepared in accordance with the invention had the composition:

| | In mole percent |
|---|---|
| $P_2O_5$ | 27.75 |
| $B_2O_3$ | 7.00 |
| $Al_2O_3$ | 19.05 |
| $Fe_2O_3$ | 0 |
| BaO | 3.85 |
| CaO | 7.15 |
| MgO | 0 |
| ZnO | 7.30 |
| $K_2O$ | 9.25 |
| $Na_2O$ | 18.65 |

| | In weight percent |
|---|---|
| $P_2O_5$ | 39.50 |
| $B_2O_3$ | 4.90 |
| $Al_2O_3$ | 19.50 |
| $Fe_2O_3$ | 0 |
| BaO | 5.90 |
| CaO | 4.00 |
| MgO | 0 |
| ZnO | 5.90 |
| $K_2O$ | 8.70 |
| $Na_2O$ | 11.60 |

The viscosity of this glass had the following values: log $n=3.5$ @675° C. log $n=3$ @720° C. log $n=2.5$ @773° C.

EXAMPLE 5

This glass made in accordance with the invention had the composition:

| | In mole percent |
|---|---|
| $P_2O_5$ | 27.80 |
| $B_2O_3$ | 7.00 |
| $Al_2O_3$ | 19.00 |
| $Fe_2O_3$ | 0 |
| BaO | 3.85 |
| CaO | 6.90 |
| MgO | 7.55 |
| ZnO | 0 |
| $K_2O$ | 9.30 |
| $Na_2O$ | 18.60 |

In weight percent

| | |
|---|---|
| $P_2O_5$ | 40.70 |
| $B_2O_3$ | 5.05 |
| $Al_2O_3$ | 20.00 |
| $Fe_2O_3$ | 0 |
| BaO | 6.10 |
| CaO | 4.00 |
| MgO | 3.10 |
| ZnO | 0 |
| $K_2O$ | 9.00 |
| $Na_2O$ | 11.95 |

This glass melted readily at 1260° C.

EXAMPLE 6

This glass made in accordance with the invention had the composition:

In mole percent

| | |
|---|---|
| $P_2O_5$ | 27.00 |
| $B_2O_3$ | 6.80 |
| $Al_2O_3$ | 18.55 |
| $Fe_2O_3$ | 0 |
| BaO | 3.75 |
| CaO | 0 |
| MgO | 9.70 |
| ZnO | 7.10 |
| $K_2O$ | 9.00 |
| $Na_2O$ | 18.15 |

In weight percent

| | |
|---|---|
| $P_2O_5$ | 39.50 |
| $B_2O_3$ | 4.90 |
| $Al_2O_3$ | 19.50 |
| $Fe_2O_3$ | 0 |
| BaO | 5.90 |
| CaO | 0 |
| MgO | 4.00 |
| ZnO | 5.90 |
| $K_2O$ | 8.70 |
| $Na_2O$ | 11.60 |

A particular advantage of the invention resides in the ability to make desirable alterations in its properties, particularly to alter its attackability by water without basic alteration of its lubricating effect, and to alter its viscosity for particular uses without making a basic alteration in its predominant qualities.

As many apparently widely different embodiments of the present invention may be made without departing from the spirit and scope thereof, it is to be understood that the invention is not limited to the specific embodiments.

What is claimed is:

1. Glass having the basic composition in mole percent:

| | Percent |
|---|---|
| $P_2O_5$ | 29–61 |
| $Al_2O_3$ | 10–20 |
| At least one alkali metal oxide | 9–33 |
| Divalent metal oxides from the group consisting of BaO, CaO, MgO and ZnO, all of which are present in substantial amounts, CaO being not in excess of 15 mole percent and ZnO being in excess of 5% of the weight of the glass | 16–20 | in which PbO may replace one of the divalent metal oxides mole for mole up to 5 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ provided that $Al_2O_3$ is not less than 10%, and in which the amount of said alkali metal oxide plus said divalent metal oxides, is less than 50% of the basic composition.

2. Glass approximating the molecular composition:

| | |
|---|---|
| $P_2O_5$ | 27.45 |
| $B_2O_3$ | 6.90 |
| $Al_2O_3$ | 18.75 |
| BaO | 0.70 |
| CaO | 6.80 |
| MgO | 4.75 |
| ZnO | 7.15 |
| $K_2O$ | 9.15 |
| $Na_2O$ | 18.35 |

3. Glass approximating the molecular composition:

| | |
|---|---|
| $P_2O_5$ | 27.75 |
| $B_2O_3$ | 7.00 |
| $Al_2O_3$ | 19.05 |
| BaO | 3.85 |
| CaO | 7.15 |
| ZnO | 7.30 |
| $K_2O$ | 9.25 |
| $Na_2O$ | 18.65 |

4. Glass approximating the molecular composition:

| | |
|---|---|
| $P_2O_5$ | 27.00 |
| $B_2O_3$ | 6.80 |
| $Al_2O_3$ | 18.55 |
| BaO | 3.75 |
| MgO | 9.70 |
| ZnO | 7.10 |
| $K_2O$ | 9.00 |
| $Na_2O$ | 18.15 |

5. Glass having the basic composition in mole percent:

| | Percent |
|---|---|
| $P_2O_5$ | 29–61 |
| $Al_2O_3$ | 10–20 |
| At least one alkali metal oxide | 9–33 |
| Divalent metal oxides from the group consisting of BaO, CaO and ZnO all of which are present in substantial amounts, ZnO being in excess of 5% of the weight of the glass | 16–20 | in which PbO may replace one of the divalent metal oxides mole for mole up to 5 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ provided that $Al_2O_3$ is not less than 10%, and in which the amount of said alkali metal oxide plus said divalent metal oxides is less than 50% of the basic composition.

6. Glass having the basic composition in mole percent:

| | Percent |
|---|---|
| $P_2O_5$ | 29–61 |
| $Al_2O_3$ | 10–20 |
| At least one alkali metal oxide | 9–33 |
| BaO with at least two divalent metal oxides from the group consisting of CaO, MgO and ZnO, each in substantial amounts, CaO being not over 15 mole percent and ZnO, if present, being in excess of 5% of the weight of the glass | 16–20 | in which PbO may replace one of the divalent metal oxides mole for mole up to 5 mole percent, in which $B_2O_3$ may replace $P_2O_5$ mole for mole up to 10% of the basic composition, in which at least one of the group of trivalent metal oxides consisting of $Fe_2O_3$ and $Cr_2O_3$ may replace $Al_2O_3$ provided that $Al_2O_3$ is not less than 10%, and in which the amount of said alkali metal oxide plus said divalent metal oxide is less than 50% of the basic composition.

References Cited

UNITED STATES PATENTS

| | | | |
|---|---|---|---|
| 2,227,082 | 12/1940 | Grimm et al. | 106—47 |
| 2,390,191 | 12/1945 | Stanworth | 106—47 |
| 2,920,972 | 1/1960 | Godron | 106—47 |
| 3,253,933 | 5/1966 | Godron | 106—47 |
| 3,253,934 | 5/1966 | Gordon | 106—47 |

HELEN M. McCARTHY, Primary Examiner

U.S. Cl. X.R.

71—33; 207—10